United States Patent [19]

Deininger et al.

[11] Patent Number: 4,983,306
[45] Date of Patent: Jan. 8, 1991

[54] METHOD OF TREATING WASTE WATER

[75] Inventors: J. Paul Deininger; Linda K. Chatfield, both of Colorado Springs, Colo.

[73] Assignee: The Regents of the University of California, Los Alamos, N. Mex.

[21] Appl. No.: 349,285

[22] Filed: May 9, 1989

[51] Int. Cl.$^5$ ............................................. C02F 1/52
[52] U.S. Cl. .................................. 210/724; 210/726; 210/912; 252/631; 423/11
[58] Field of Search ............... 210/702, 716, 717, 723, 210/724, 726, 912, 721; 252/631; 423/11

[56] References Cited

U.S. PATENT DOCUMENTS

| | | | |
|---|---|---|---|
| 2,766,204 | 10/1956 | Lowe | 423/11 |
| 2,873,169 | 2/1959 | Seaborg et al. | 210/723 |
| 3,013,978 | 12/1961 | Rosinski | 210/724 |
| 3,330,771 | 7/1967 | Komatsu et al. | 210/723 |
| 3,890,244 | 6/1975 | Carlin | 252/631 |
| 4,269,706 | 5/1981 | Sondermann | 210/724 |
| 4,312,758 | 1/1982 | Berton et al. | 210/724 |
| 4,377,508 | 3/1983 | Rothberg | 423/11 |
| 4,405,573 | 9/1983 | Deininger et al. | 423/150 |
| 4,572,797 | 2/1986 | Silver | 252/631 |

OTHER PUBLICATIONS

*The Condensed Chemical Dictionary*, 8th Edition, Von Nostrand Reinhold Co., 1971.

R. Kent Murmann et al., "Experiments Utilizing FeO$_4{}^{2-}$ for Purifying Water", vol. 8, pp. 543-547 (1974), *Water Research*.

William J. Cooper, "Chemistry in Water Reuse", vol. 2, pp. 5-11-561, Ann Arbor Science.

R. Kent Murmann, "The Preparation and Oxidative Properties of Ferrate Ion", NTIS Publication PB-238 057 (1974).

Thomas D. Waite, "Feasibility of Wastewater Treatment with Ferrate," ASCE Journal of Environmental Engineering Division, 105, pp. 1023-1034 (1979).

*Primary Examiner*—Peter Hruskoci
*Attorney, Agent, or Firm*—Paul D. Gaetjens; Bruce H. Cottrell

[57] ABSTRACT

A process of treating water to remove transuranic elements contained therein by adjusting the pH of a transuranic element-containing water source to within the range of about 6.5 to about 14.0, admixing the water source with an alkali or alkaline earth ferrate in an amount sufficient to form a precipitate within the water source, the amount of ferrate effective to reduce the transuranic element concentration in the water source, permitting the precipitate in the admixture to separate and thereby yield a supernatant liquid having a reduced transuranic element concentration, and separating the supernatant liquid having the reduced transuranic element concentration from the admixture is provided. Additionally, a water soluble salt, e.g., a zirconium salt, can be added with the alkali or alkaline earth ferrate in the process to provide greater removal efficiencies. A composition of matter including an alkali or alkaline earth ferrate and a water soluble salt, e.g., a zirconium salt, is also provided.

14 Claims, 2 Drawing Sheets

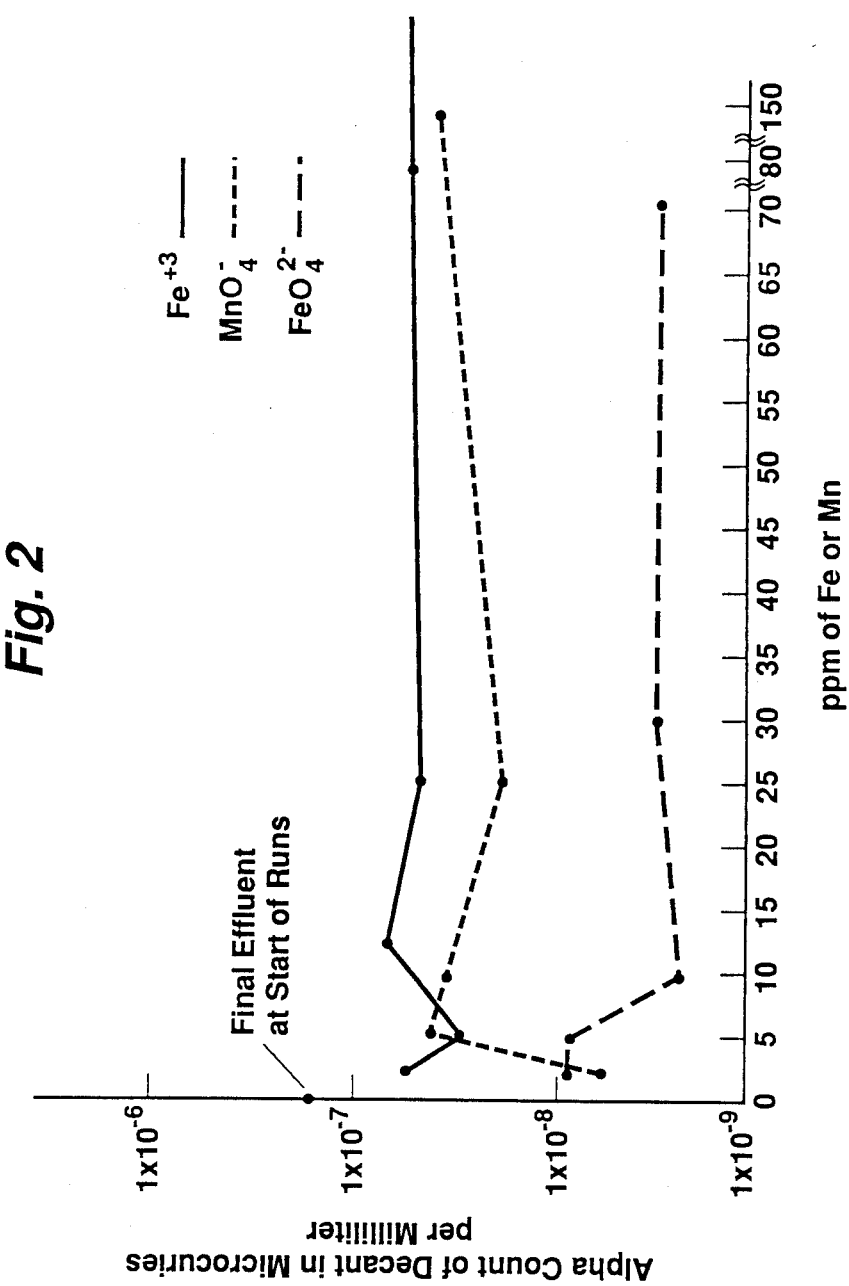

METHOD OF TREATING WASTE WATER

This invention is the result of a contract with the Department of Energy (Contract No. W-7405-ENG-36).

FIELD OF THE INVENTION

The present invention relates to the field of water purification and more particularly to the field of treating aqueous waste streams containing transuranic elements, e.g., plutonium, as contaminants.

BACKGROUND OF THE INVENTION

While water treatment techniques are available to remove contaminants, e.g., metal contaminants and in particular, transuranic metal contaminants, it is desirable that such processes generate a minimum of resultant sludge or solid waste as increased cost for disposal of solid metal wastes has forced industries and governmental agencies to seek techniques that generate less solid waste in a cost effective manner. Presently, ferric or ferrous salts such as ferric sulfate, ferric chloride and ferrous chloride or ferrous sulfate are used as coagulants for removal of trace amounts of transuranic elements from wastewater streams. However, lower allowable standards for wastewater discharge may not be easily met by such coagulants without generation of excessive solid waste.

In the past few years, there has been increased interest by the water treatment industry in the use of ferrate salts as, e.g., a possible substitute for chlorination processes. For example, potassium ferrate may be used in the treatment and purification of water (see Murmann et al, "Experiments Utilizing $FeO_4^{-2}$ for Purifying Water". Water Research, Vol. 8, pp. 79–93 (1974); Gilbert et al, "An Investigation of the Applicability of Ferrate Ion for Disinfection", J. Am. Water Works, Vol. 68(9), pp. 495–497 (1986); and Waite et al., "Iron (VI) Ferrate as a General Oxidant for Water and Wastewater Treatment", Ozone/Chlorine Dioxide Oxid. Prod., Org. Matter Process Conference, (1976), published 1978, pp. 410–425). Ferrate salts are also known as useful for precipitation and/or coagulation of solids in the wastewater.

Stricter laws and regulations aimed at protecting public health and preventing contamination of the environment have been gradually instituted by various federal and state governmental bodies. For example, the Water Pollution Control Act and Safe Drinking Water Act have set specific requirements on the quality of water discharged into streams and served to the public as potable water. Other government agencies, such as the Department of Energy (DOE), have also promulgated orders setting permissible effluent discharge standards for transuranic elements and other radionuclides from DOE facilities. Presently, DOE Order 5480.1 derived concentration guideline sets discharge limits for plutonium 238, plutonium 239/240 and americium 241 at $1 \times 10^{-4}$ microcuries per milliliter. A stricter standard is expected to issue by DOE in late 1989, setting limits for the plutonium and americium contaminants at $3-4 \times 10^{-8}$ microcuries per milliliter. This standard may not be consistently achievable with the present processes of treating wastewater at DOE facilities.

Accordingly, it is one object of this invention to develop a process of treating transuranic element-containing water to reduce the level of transuranic element contaminants.

It is another object of this invention to remove transuranic elements from contaminated water to under anticipated governmental discharge limits, e.g., DOE effluent standards.

It is still a further object of this invention to minimize production of the resultant solid waste, i.e., sludge, upon removal of the transuranic elements from contaminated water.

Yet another object of this invention is to remove transuranic elements from contaminated water without increasing the levels of chemical additives presently used and without alteration of presently existing process equipment.

SUMMARY OF THE INVENTION

To achieve the foregoing and other objects, and in accordance with the purposes of the present invention, as embodied and broadly described herein, the present invention provides a process of treating water to remove transuranic elements contained therein comprising adjusting the pH of a transuranic element-containing water source to within the range of about 6.5 to about 14.0, admixing said water source with an amount of an alkali or alkaline earth ferrate sufficient to form a precipitate within said water source, said amount of ferrate effective to reduce the transuranic element concentration in said water source, permitting the precipitate in said admixture to separate and thereby yield a supernatant liquid having a reduced transuranic element concentration, and separating said supernatant liquid having the reduced transuranic element concentration from the admixture.

In one embodiment of the invention, the process further involves admixing the pH-adjusted transuranic element-containing wastewater with a mixture of an alkali or alkaline earth ferrate and a water soluble salt containing a high valence metal ion selected from the group consisting of Groups IVB, VB, or VIB of the periodic table in an amount sufficient to remove substantially all of the transuranic elements.

The present invention further provides a composition of matter useful in reducing the transuranic element concentration of a transuranic element-containing wastewater including an alkali or alkaline earth ferrate, and a water soluble salt containing a high valence metal ion selected from the group consisting of Groups IVB, VB, and VIB of the periodic table.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2 is a graph of experimental results showing a comparison of the use of ferrate in accordance with the present invention with the use of ferric ions or permanganate ions, and the efficiency of each in removing transuranic elements from wastewater.

DETAILED DESCRIPTION OF THE PREFERRED EMBODIMENT

Figure 1:
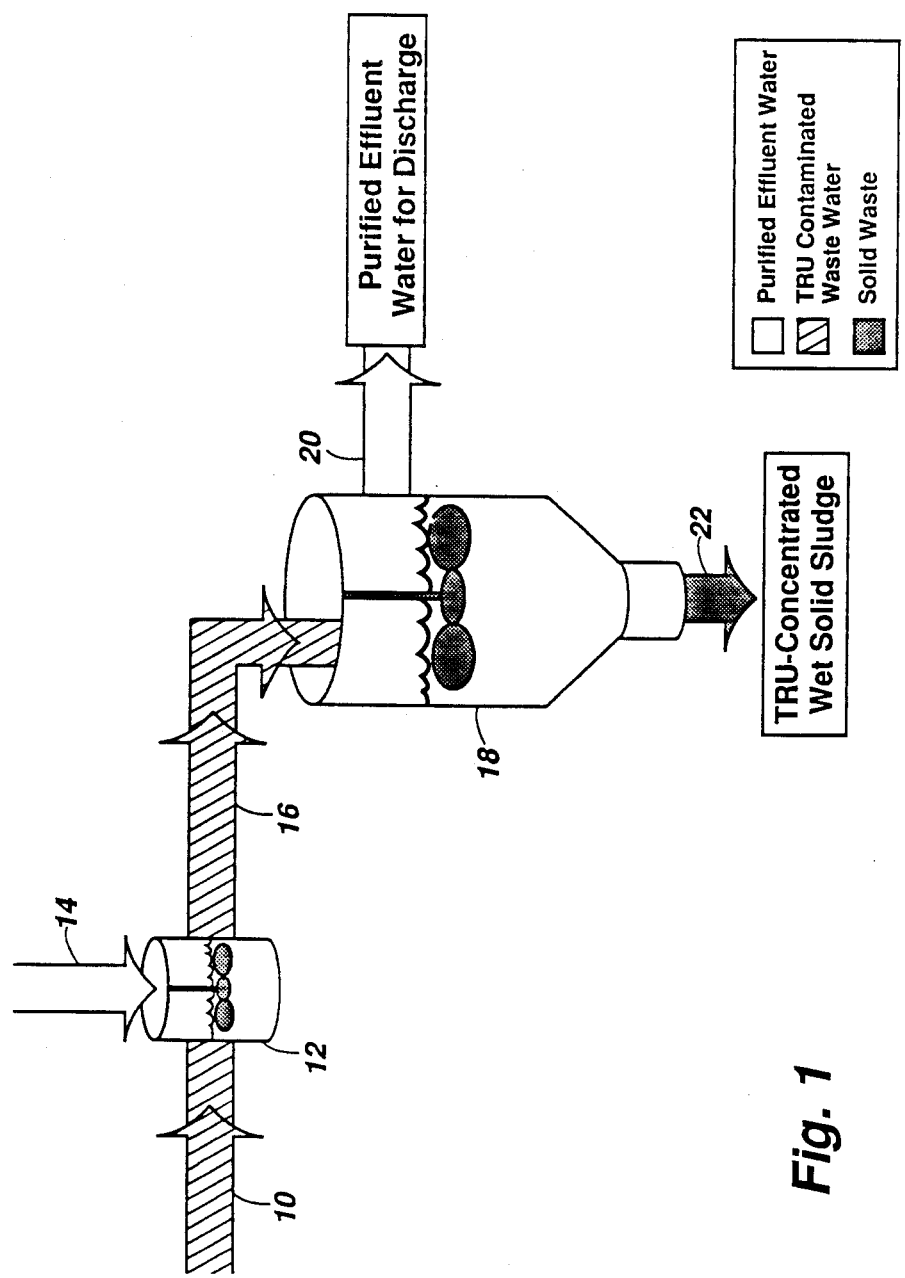
FIG. 1 is a representative schematic drawing of a wastewater treatment system for practicing the present invention.

The present invention concerns a wastewater treatment process which uses ferrate ions for the removal of trace amounts of transuranic (TRU) elements and other water-borne radionuclides via a coagulation/precipitation process. The resultant waste water effluent is substantially pure with respect to TRU elements and other radionuclide elements to within EPA drinking water and both present and planned Department of Energy (DOE) emission standards, i.e., from 3 to $4 \times 10^{-8}$ microcuries per milliliter of plutonium 238/239/240 or americium 241. Other transuranic elements such as neptunium and curivm, and uranium may also be removed by this process. The wastewater treatment process of the present invention can achieve removal of TRU elements to lower levels than can the existing ferric-based technology without the need for either drastic increases in chemical dosages or capital costs for new process equipment. The wastewater treatment process of the present invention is expected to further achieve the removal of TRU elements with the use of very low dosages of additives thereby resulting in decreased production of iron-oxyhydroxide sludge in comparison to the existing technologies. Optionally, the wastewater treatment process of this invention can be used after a conventional ferric salt process has been employed to further reduce the transuranic element concentration in the wastewater.

The process of the invention can be conducted in accordance with a water treatment system illustrated in FIG. 1. In FIG. 1, a continuous wastewater treatment process is shown including a TRU-containing wastewater stream 10 which enters a flash mixer 12 wherein treatment chemicals 14 are added. A treated wastewater stream 16 enters clarifier 18 whereat a purified effluent stream 20 is removed for discharge and a TRU-concentrated solid sludge 22 is removed for appropriate disposal.

In the present wastewater treatment process, it has been found that the control of the pH is critical to obtaining the highest level of transuranic element removal. The pH should preferably be from about 6.5 to about 14.0, more preferably from about 7.0 to about 12.0. Above about 14.0, the removal of the transuranic elements is generally poor as ferrate becomes less stable, while below 6.5 the various ferrate salts are also less stable resulting in a substantially decreased performance.

In a preferred embodiment of the present wastewater treatment process, a high valence metal ion selected from the group consisting of Groups IVB, VB, or VIB of the periodic table can be added in combination with the ferrate to the wastewater. Such high valence metal ions may include oxymetallic ions such as zirconyl ions ($ZrO^{2+}$), titanyl ions ($TiO^{2+}$), hafnyl ions ($HfO^{2+}$), vanadyl ions ($VO^{2+}$), chromyl ions ($CrO_2^{2+}$), and the like. Such oxymetallic ions may be added as water soluble salts of such ions. Zirconyl ions are preferred as the additive used in combination with the ferrate in practicing the present invention. Such zirconyl ions can be added as a water soluble zirconium compound, e.g., zirconium oxychloride ($ZrOCl_2 \cdot 8H_2O$), zirconium oxybromide or zirconium oxyiodide. While not wishing to be bound by the present explanation, such oxymetallic ions, e.g., zirconyl ions, are believed to provide for decomplexation of transuranic elements from various organic complexes in which the transuranic elements can become associated. While such water soluble salts are described as added in combination with the ferrate in practicing the invention, such salts may also be added prior to addition of the ferrate or after addition of the ferrate so long as there is sufficient ferrate still present to permit reduction of the transuranic element concentration.

Preferably, the water soluble salts, e.g., a zirconium salt, are added in an amount effective to further reduce transuranic element concentrations in the resultant purified water. Generally, water soluble zirconium salt added in amounts sufficient to give zirconium ion concentrations of from about $1 \times 10^{-8}$ molar to about 10 grams per liter will achieve the desired effective amount.

The ferrate ions admixed with the pH-adjusted wastewater can be provided by any suitable alkali or alkaline earth ferrate in the form of either a solid or a liquid solution. Suitable ferrate compounds include potassium ferrate, sodium ferrate, or barium ferrate. Potassium ferrate is preferred as the ferrate.

The ferrate is generally added to the wastewater in amounts sufficient to give iron concentrations, based upon ferrate ion, of from about 0.1 parts per million (ppm) to about 250 ppm, more preferably from about 1 ppm to about 50 ppm, and most preferably from about 5 to about 25 ppm. Generally, amounts of ferrate yielding iron concentrations above about 250 ppm are undesirable as such levels may generate excessive floc or solid waste.

In the practice of the present process, the ferrate or the combination of ferrate and the water soluble salt, e.g., a zirconium salt, can be used to remove the trace amounts of the transuranic elements in either a batch or a continuous process. Also, the temperature of the wastewater during operation of the present process can be varied so long as the wastewater stream remains liquid. Generally, the wastewater temperature can be from about $-25$. Celsius ($^\circ$C.) to about 95$^\circ$ C., more preferably from about 0$^\circ$ C. to about 70$^\circ$ C.

The present invention is more particularly described in the following examples which are intended as illustrative only, since numerous modifications and variations will be apparent to those skilled in the art.

Example 1 describes comparative studies made between the previous techniques using ferric sulfate ($Fe_2(SO_4)_3$) or potassium permanganate ($KMnO_4$), and the technique of the present invention, i.e., using potassium ferrate ($K_2FeO_4$).

EXAMPLE 1

An aqueous waste stream sample was collected from the Los Alamos TA-50 waste treatment plant. The sample was of final effluent, already treated with one or more passes through a ferric salt addition, coagulation, settling and filtration process. The final effluent was that designated for discharge to the environment. Smaller samples of 600 milliliter (ml) volume were measured out from the waste stream and the pH measured. To each 600 ml sample was added 0.36 grams (g) of calcium chloride with stirring. The pH was again measured and adjusted to 8.0 if needed. Each 600 ml sample was then divided into three 200 ml samples and each 200 ml sample was placed into a separate reaction vessel. Teflon-coated stir bars were placed into each vessel and the vessels were placed on stirring plates to provide for agitation. Glass rods were placed in each vessel to act as baffles.

A specific amount of either ferric sulfate, potassium permanganate or potassium ferrate was then added to each respective reaction vessel. These amounts were added to correspond to the desired parts per million of iron or manganese. Observations such as color change, time of addition, and pH were made. The solutions were then stirred rapidly for 15 minutes and observations were again made. Stirring was then stopped and the solutions were allowed to settle overnight for about 15 to 18 hours. A sample of each clarified supernatant solution was analyzed for transuranic elements as total counts of alpha radioactivity using a standard plate alpha-counting apparatus. The results of these comparative studies are shown in Table 1.

TABLE 1

| sample | ppm Fe or Mn | initial pH | final pH of decant | alpha count of decant in microcuries per milliliter |
|---|---|---|---|---|
| final effluent | — | 7.8 | 7.7 | $2.4 \times 10^{-7}$ |
| ferric |  |  |  |  |
| #1 | 2 | 8.0 | 7.1 | $6.0 \times 10^{-8}$ |
| #2 | 5 | 7.4 | 7.4 | $3.0 \times 10^{-8}$ |
| #3 | 13 | 7.4 | 7.4 | $8.4 \times 10^{-8}$ |
| #4 | 26 | 7.6 | 7.3 | $6.7 \times 10^{-8}$ |
| #5 | 79 | 7.8 | 7.1 | $6.7 \times 10^{-8}$ |
| #6 | 186 | — | 6.8 | $6.7 \times 10^{-8}$ |
| permanganate |  |  |  |  |
| #1 | 2 | 7.8 | 7.8 | $6.3 \times 10^{-9}$ |
| #2 | 5 | — | 7.7 | $5.1 \times 10^{-8}$ |
| #3 | 10 | 7.4 | 7.6 | $4.8 \times 10^{-8}$ |
| #4 | 25 | 7.4 | 7.5 | $2.1 \times 10^{-8}$ |
| #5 | 50 | 7.5 | 7.6 | $3.0 \times 10^{-8}$ |
| #6 | 150 | 7.5 | 7.8 | $5.8 \times 10^{-8}$ |
| #7 | 350 | — | 9.1 | $4.9 \times 10^{-8}$ |
| ferrate |  |  |  |  |
| #1 | 2 | 7.6 | 7.5 | $4.2 \times 10^{-8}$ |
| #2 | 5 | 7.7 | 7.5 | $9.0 \times 10^{-9}$ |
| #3 | 10 | 7.8 | 7.5 | $2.7 \times 10^{-9}$ |
| #4 | 30 | 7.9 | 7.6 | $3.6 \times 10^{-9}$ |
| #5 | 70 | 8.0 | 8.0 | $3.6 \times 10^{-9}$ |

The results of Table 1 show that the use of ferrate removes transuranic elements from wastewater final effluents to lower levels than is possible by the use of ferric ions (ferric sulfate) or permanganate ions (potassium permanganate). FIG. 2 graphically illustrates the final effluent treatment results given in Table 1.

Example 2 describes comparative testing of wastewater treatments using ferrate ions alone and in combination with zirconium ions.

EXAMPLE 2

Aqueous waste stream samples were collected from the Los Alamos TA-50 waste treatment plant. The various samples included: (a) a sample of raw plant feed which is the original feed that arrives at the wastewater treatment facility; (b) a sample of final effluent which is that designated for discharge to the environment; and (c) a sample of clarifier overflow from the treatment plant clarifier. Samples of 1000 milliliter volumes of the water were each placed into a reaction vessel and the pH adjusted to predetermined values. In some tests, measured amounts of reagent grade hydrated zirconium oxychloride salt were added while agitating rapidly, followed by addition of measured amounts of potassium ferrate salt to the stirred vessel. The admixture was allowed to mix from about 2 to about 5 minutes. This was to simulate a flash mixing step of a typical water treatment plant. In some tests, only the potassium ferrate was added during the flash mixing step. The vessel contents were then stirred much more slowly to simulate a stirred coagulation step for about 30 minutes whereafter stirring was stopped. After at least another 30 minutes and up to about 4 hours depending upon the sample and additives, the samples were allowed to sit without disturbance to simulate a plant gravity settling step for clarification of the slurry to a concentrated sludge and a clarified supernatant liquid. Samples of each clarified supernatant liquid were analyzed as total counts of alpha radioactivity using a standard plate alpha-counting apparatus, and some supernatant samples were concentrated in terms of plutonium using an ion-exchange technique and counted by gamma spectrometry. The latter analysis gives a more accurate measure at the low analytical levels. The results are shown in Table 2.

TABLE 2

| sample | ppm Fe as $FeO_4^{-2}$ | g/l as $ZrOCl_2 \cdot 6H_2O$ | alpha count of decant in picocuries/liter | plutonium (picocuries/l) Pu 239 | Pu 238 |
|---|---|---|---|---|---|
| aqueous raw feed | 0.0 | 0.0 | $61,400 \pm 1500$ | — | — |
| raw feed treated |  |  |  |  |  |
| #1 pH 6.5 | 10 | 0.5 | $1300 \pm 200$ | — | — |
| #2 pH 6.5 | 10 | 0.5 | $1900 \pm 300$ | — | — |
| #3 pH 6.5 | 10 | 0.5 | $6800 \pm 500$ | — | — |
| final effluent | 0.0 | 0.0 | $440 \pm 130$ | — | — |
| final effluent treated |  |  |  |  |  |
| #1 pH 9.4 | 5 | 0.5 | $74 \pm 66$ | — | — |
| #2 pH 9.4 | 10 | 0.5 | $240 \pm 100$ | — | — |
| #3 pH 9.4 | 25 | 0.5 | $56 \pm 60$ | $24 \pm 7$ | $6 \pm 5$ |
| #4 pH 9.4 | 5 | 0.0 | $130 \pm 82$ | — | — |
| #5 pH 9.4 | 10 | 0.0 | $190 \pm 93$ | — | — |
| #6 pH 9.4 | 25 | 0.0 | $120 \pm 77$ | — | — |
| #7 pH 6.5 | 25 | 0.5 | $47 \pm 58$ | $3.6 \pm 4.2$ | $4.7 \pm 4.2$ |
| #8 pH 6.5 | 25 | 0.0 | $28 \pm 52$ | $8.4 \pm 4.6$ | $2.0 \pm 3.6$ |
| clarifier overflow | 0.0 | 0.0 | $160 \pm 87$ | $78 \pm 54$ | $62 \pm 49$ |
| clarifier overflow treated |  |  |  |  |  |

TABLE 2-continued

| sample | ppm Fe as $FeO_4^{-2}$ | g/l as $ZrOCl_2 \cdot 6H_2O$ | alpha count of decant in pico-curies/liter | plutonium (picocuries/l) Pu 239 | Pu 238 |
|---|---|---|---|---|---|
| #1 pH 12 | 5 | 0.03 | 47 ± 58 | 3.0 ± 7.0 | 0 ± 6.0 |
| #2 pH 12 | 25 | 0.03 | 0 ± 41 | 8.5 ± 4.6 | 3.3 ± 3.8 |

The results of Table 2 show that the use of ferrate ions and zirconium ions in combination are superior in removing transuranic elements than ferrate ions alone. For example, comparison of (a) raw feed treated samples 1 and 2 with 3, (b) final effluent treated samples 1, 2 and 3 with 4, 5 and 6, and (c) final effluent treated sample 7 with 8, show the improvement obtained by ferrate ions in combination with zirconium ions. In addition, the results show that substantially all of the transuranic elements can be removed using treatment levels of this admixture of only a few parts per million. In comparison, the standard commercialized process generally employs 100 parts per million of a ferric or ferrous salt and 300 parts per million of lime (calcium hydroxide) to obtain the same or slightly less transuranic element removal. Thus, it appears reasonable to expect that the process of this invention would result in considerably less insoluble sludge than the prior processes. Although the present invention has been described with reference to specific details, it is not intended that such details should be regarded as limitations upon the scope of the invention, except as and to the extent that they are included in the accompanying claims.

What is claimed is:

1. A process of treating water to reduce the concentration of the transuranic elements contained therein comprising:
   a. adjusting the pH of a transuranic element-containing water source to within the range of about 6.5 to about 14.0;
   b. admixing said water source with an alkali or alkaline earth ferrate in an amount sufficient to form a precipitate within said water source, said amount of ferrate effective to reduce the transuranic element concentration in said water source;
   c. allowing the precipitate in said admixture to separate and thereby yield a supernatant liquid having a reduced transuranic element concentration; and
   d. separating said supernatant liquid having the reduced transuranic element concentration from the admixture.

2. The process of claim 1 wherein said water source is admixed with a combination of the alkali or alkaline earth ferrate and a water soluble salt containing a high valence metal ion selected from the group consisting of Groups IVB, VB, or VIB of the periodic table.

3. The process of claim 2 where the water soluble salt containing a high valence metal ion is zirconium oxychloride.

4. The process of claim 3 wherein zirconium oxychloride is added in the admixture at from about 0.01 to about 5 grams of zirconium oxychloride per liter of wastewater.

5. The process of claim 1 wherein the alkali or alkaline earth ferrate is potassium ferrate.

6. The process of claim 5 wherein the potassium ferrate is added as a solid.

7. The process of claim 5 wherein the potassium ferrate is added as a solution.

8. A process of treating water to remove transuranic elements contained therein comprising:
   a. adjusting the pH of a transuranic element-containing water source to within the range of about 6.5 to about 14.0;
   b. admixing said water source with an alkali or alkaline earth ferrate in an amount sufficient to form a precipitate and remove a substantial portion of the transuranic elements from the water source; and,
   c. separating water having a substantially reduced transuranic element concentration from said precipitate.

9. The process of claim 8 wherein said water source is admixed with a combination of the alkali or alkaline earth ferrate and a water soluble salt containing a high valence metal ion selected from the group consisting of Groups IVB, VB, or VIB of the periodic table.

10. The process of claim 9 where the water soluble salt is zirconium oxychloride.

11. The process of claim 10 wherein zirconium oxychloride is added in the admixture at about 0.5 grams of zirconium oxychloride per liter of wastewater.

12. The process of claim 8 wherein the alkali or alkaline earth ferrate is potassium ferrate.

13. The process of claim 12 wherein the potassium ferrate is added as a solid.

14. The process of claim 12 wherein the potassium ferrate is added as a solution.

* * * * *